(12) United States Patent
Schulze et al.

(10) Patent No.: US 9,915,940 B2
(45) Date of Patent: Mar. 13, 2018

(54) BI-DIRECTIONAL ASSOCIATION AND GRAPHICAL ACQUISITION OF TIME-BASED EQUIPMENT SENSOR DATA AND MATERIAL-BASED METROLOGY STATISTICAL PROCESS CONTROL DATA

(71) Applicant: Applied Materials, Inc., Santa Clara, CA (US)

(72) Inventors: Brad Schulze, Phoenix, AZ (US); Joseph Dox, Bosford, MA (US)

(73) Assignee: Applied Materials, LLC, Santa Clara, CA (US)

( * ) Notice: Subject to any disclaimer, the term of this patent is extended or adjusted under 35 U.S.C. 154(b) by 697 days.

(21) Appl. No.: 13/664,347

(22) Filed: Oct. 30, 2012

(65) Prior Publication Data

US 2013/0110263 A1    May 2, 2013

Related U.S. Application Data

(60) Provisional application No. 61/553,891, filed on Oct. 31, 2011.

(51) Int. Cl.
  *G05B 9/02*     (2006.01)
  *G05B 19/418*   (2006.01)
  *G05B 23/02*    (2006.01)

(52) U.S. Cl.
  CPC ... *G05B 19/41875* (2013.01); *G05B 23/0272* (2013.01); *G05B 2219/32179* (2013.01);
  (Continued)

(58) Field of Classification Search
  CPC .......... G05B 19/41875; G05B 23/0272; G05B 2219/32179; G05B 2219/45031;
  (Continued)

(56) References Cited

U.S. PATENT DOCUMENTS 6,727,106 B1 *  4/2004  Ankutse ........... G05B 19/41875
                                                    438/5
6,740,534 B1 *  5/2004  Adams, III ...... G05B 19/41875
                                                257/E21.525

(Continued)

FOREIGN PATENT DOCUMENTS

CN         1333451 C    6/2005
CN       101048711 A   10/2007

OTHER PUBLICATIONS

Goodlin et al. "Simultaneous Fault Detection and Classification for Semiconductor Manufacturing Tools", Oct. 23, 2003 [retrieved on Dec. 28, 2003] retrieved from <URL: http://www-mtl.mit.edu/researchgroups/Metrology/PAPERS/goodlin-fault-detect-jecs2003.pdf> pp. G778-G784.

(Continued)

*Primary Examiner* — M. N. Von Buhr
(74) *Attorney, Agent, or Firm* — Lowenstein Sandler LLP

(57) ABSTRACT

A method and system for linking sensor data to metrology data and metrology data to sensor data is described herein. In one embodiment, a user selection of metrology data for a product is received, related process tool fault detection summary for the selected metrology data for the product is presented, a user selection of a process tool from the process tool fault detection summary is received, and related fault detection details for the selected process tool are presented.

20 Claims, 6 Drawing Sheets

(52) U.S. Cl.
CPC .............. *G05B 2219/32201* (2013.01); *G05B 2219/32222* (2013.01); *G05B 2219/45031* (2013.01); *Y02P 90/22* (2015.11)

(58) Field of Classification Search
CPC ........... G05B 2219/32201; G05B 2219/32222; Y02P 90/22
See application file for complete search history.

(56) References Cited

U.S. PATENT DOCUMENTS

| | | | |
|---|---|---|---|
| 6,751,518 B1 * | 6/2004 | Sonderman | H01L 21/67276 700/110 |
| 6,836,691 B1 | 12/2004 | Stirton | |
| 6,850,811 B1 * | 2/2005 | Stewart | G05B 19/41875 438/12 |
| 6,970,758 B1 * | 11/2005 | Shi | G05B 15/02 700/108 |
| 7,098,048 B1 * | 8/2006 | Peterson | G01R 31/01 438/14 |
| 7,292,959 B1 * | 11/2007 | Markle | G05B 19/41875 702/182 |
| 7,321,993 B1 * | 1/2008 | Markle | G05B 23/0235 714/47.1 |
| 7,348,187 B2 * | 3/2008 | Maeritz | G05B 19/41875 257/E21.525 |
| 7,477,960 B2 * | 1/2009 | Willis | G05B 19/4184 700/110 |
| 7,599,817 B2 * | 10/2009 | Matsushita | G05B 23/024 702/185 |
| 7,606,681 B2 * | 10/2009 | Esmaili | G05B 17/02 340/3.1 |
| 7,640,070 B2 * | 12/2009 | Chang | G05B 19/4184 700/110 |
| 7,934,125 B2 * | 4/2011 | Harvey et al. | 714/25 |
| 8,010,321 B2 * | 8/2011 | Lin et al. | 702/185 |
| 8,229,587 B2 * | 7/2012 | Shieh | G05B 19/41885 700/110 |
| 2002/0069349 A1 * | 6/2002 | Toprac | G05B 13/024 712/224 |
| 2003/0061212 A1 * | 3/2003 | Smith | G06Q 10/06 |
| 2003/0171885 A1 | 9/2003 | Coss et al. | |
| 2004/0254762 A1 * | 12/2004 | Hopkins | C23C 16/52 702/182 |
| 2005/0047645 A1 * | 3/2005 | Funk | G05B 19/41865 382/145 |
| 2005/0192698 A1 * | 9/2005 | Cheng | G05B 19/41875 700/121 |
| 2005/0251365 A1 * | 11/2005 | Matsushita | G05B 19/4184 702/185 |
| 2006/0047356 A1 * | 3/2006 | Funk | G05B 19/41865 700/121 |
| 2006/0095232 A1 | 5/2006 | Purdy | |
| 2006/0106469 A1 * | 5/2006 | Huang | G05B 23/0235 700/51 |
| 2007/0006037 A1 | 1/2007 | Sargusingh et al. | |
| 2007/0021859 A1 | 1/2007 | Lev-Ami et al. | |
| 2007/0038418 A1 | 2/2007 | Ahn et al. | |
| 2007/0219738 A1 * | 9/2007 | Weiher | G05B 19/41875 702/82 |
| 2008/0027683 A1 * | 1/2008 | Middleton | G05B 23/0272 702/187 |
| 2008/0140590 A1 * | 6/2008 | Shen | G05B 19/41875 706/12 |
| 2008/0189637 A1 * | 8/2008 | Krajewski | G06F 9/4443 715/771 |
| 2008/0189638 A1 * | 8/2008 | Mody | G05B 19/0426 715/771 |
| 2008/0276136 A1 | 11/2008 | Lin et al. | |
| 2009/0037013 A1 | 2/2009 | Hendler et al. | |
| 2009/0049011 A1 * | 2/2009 | Mock | H04L 41/064 |
| 2009/0197354 A1 * | 8/2009 | Lin | G05B 19/41875 438/14 |
| 2011/0257932 A1 * | 10/2011 | Chu | G05B 23/0221 702/179 |
| 2011/0288837 A1 * | 11/2011 | Blevins | G05B 17/02 703/6 |
| 2012/0154149 A1 * | 6/2012 | Trumble | G05B 19/41875 340/540 |
| 2012/0221586 A1 * | 8/2012 | Kawata | G05B 19/41875 707/756 |

OTHER PUBLICATIONS

Search Report and Written Opinion for PCT/US2012/062859, dated Jan. 25, 2013.
Taiwanese Office Action for TW application No. 101140375 dated Apr. 20, 2016, 32 pages.
Chinese Search Report CN application No. 201280052415.2 dated Aug. 2, 2016, 31 pages.

* cited by examiner

BI-DIRECTIONAL ASSOCIATION AND GRAPHICAL ACQUISITION OF TIME-BASED EQUIPMENT SENSOR DATA AND MATERIAL-BASED METROLOGY STATISTICAL PROCESS CONTROL DATA

PRIORITY CLAIM

This application claims the benefit of U.S. Provisional Application Ser. No. 61/553,891 filed on Oct. 31, 2011, which is hereby incorporated by reference.

TECHNICAL FIELD

Embodiments of the present invention relate to processing data in a manufacturing facility, and more particularly, to linking time-based equipment sensor data with material-based metrology statistical process control data.

BACKGROUND

In manufacturing, for example, in semiconductor device fabrication, product quality is measured directly using metrology tools and indirectly by monitoring the process equipment sensors. This information is collected at different times in the product manufacturing lifecycle and stored in separate, disconnected databases from different vendors. When a manufacturing engineer needs to identify a problem with a process tool or a resulting product, he or she has to go through a laborious and costly process. For example, when an engineer is notified of a potential problem with a product, the engineer has to review corresponding metrology data to find an alarming characteristic of the product, and write down information about the product such as a lot ID, wafer ID, recipe name, etc. The engineer then has to launch another application, manually input the information about the product and search through time series sensor data to find a process tool that was used to manufacture the product. Similarly, when an engineer starts a fault detection evaluation with an alarming characteristic of a process tool, the engineer is faced with an inefficient and error-prone process.

SUMMARY

A method and system for linking sensor data to metrology data and metrology data to sensor data is described herein. In one embodiment, a user selection of metrology data for a product is received, related process tool fault detection summary for the selected metrology data for the product is presented, a user selection of a process tool from the process tool fault detection summary is received, and related fault detection details for the selected process tool are presented.

In one embodiment a user selection of fault detection details may be received, and related raw sensor data and/or a related fault detection trend chart for the selected fault detection details may be presented. In one embodiment, a user selection of sensor data may be received, related statistical process control summary data for the selected sensor data may be presented, a user selection of a statistical process control chart may be received, and the selected statistical process control chart may be presented.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for processing manufacturing data by linking time series sensor data collected from process tools and fault detection (FD) results, with metrology data (e.g., statistical process control (SPC) data) collected from product measurements. Embodiments of the invention also provide a reporting method so engineers can easily drill across from the sensor data (e.g., process tool data) to the metrology data (e.g., SPC product data) and/or from the metrology data to the sensor data. According to aspects of the present invention, data associations are resolved by applying unique relationships between a special set of context attributes from the sensor data (e.g., the tool identifiers, run identifiers and run start times) with derived unique measurement (e.g., sample) identifiers from the metrology data. Similar methodology can be applied using FD data, run to run control data, equipment performance tracking, product yield data, and equipment maintenance management systems, among others.

As a result, a core foundation is provided for an enhanced and powerful cross-drilling capability that links the data and reporting between the process tools and the metrology tools. In addition, root-cause analysis process is expedited by combining unrelated elements (e.g., data) which make up the entire manufacturing process, thus causing a decrease in equipment down times and a higher product yield.

Figure 1:
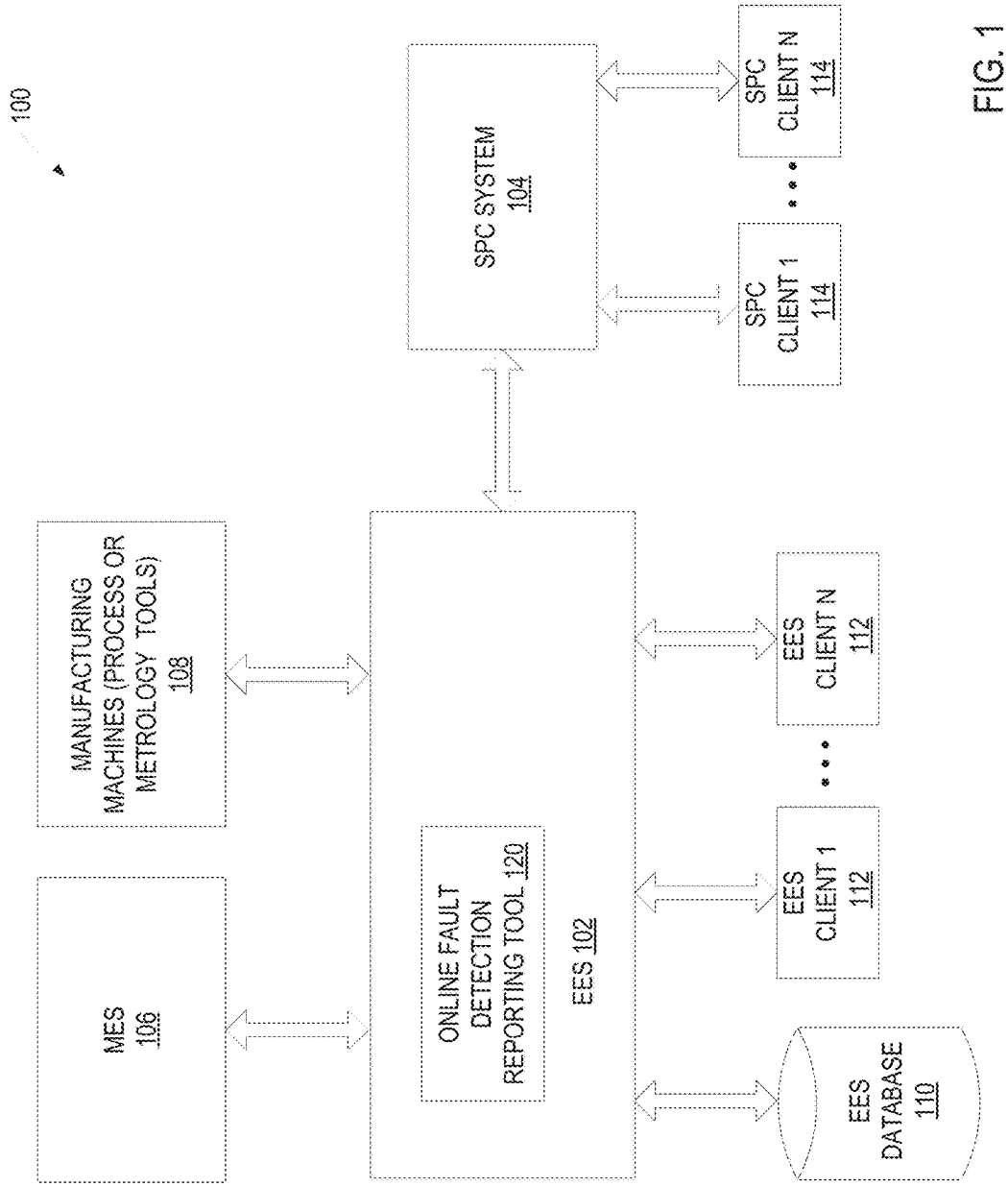
FIG. 1 is a block diagram illustrating a manufacturing system according to an embodiment of the present invention.

FIG. 1 is a block diagram illustrating a manufacturing system 100 including a manufacturing execution system (MES) 106 and manufacturing machines 108 (e.g., process or metrology tools) coupled to an equipment engineering system (EES) 102 via a network. In addition, the EES 102 is coupled to an SPC system 104 via a network. The EES 102 may further be coupled to an EES database 110 and EES clients 112 via a network, and the SPC system 104 may be coupled to SPC clients 114 via a network. The MES 106, the EES 102 and the SPC 104 can each be hosted by one or more computing devices including server computers, desktop computers, laptop computers, tablet computers, notebook computers, PDAs (personal digital assistants), mobile communications devices, cell phones, smart phones, hand-held computers, or similar computing devices.

The EES 102 receives metrology data from the metrology tools and/or the MES 106 and sends the metrology data to the SPC system 104. The SPC system 104 applies the metrology data to appropriate charts (e.g., thickness, etch rate, resistivity, particle count), analyzes the metrology data to detect violations (e.g., product characteristics that are above or below predefined thresholds), generates information about a product having a detected violation (e.g., a lot ID, a wafer ID, a recipe name), and provides this information to the EES 102. In addition, the SPC system 104 presents SPC charts to SPC clients 114, which may be thick client applications and/or web-based browser applications hosted by client devices such as personal computers, laptops, mobile phones, etc.

The EES 102 may host an online FD reporting tool 120 that provides bi-directional association and graphical acquisition of disjointed, time-based equipment sensor data and material-based metrology data (e.g., SPC data). In particular, the FD reporting tool 120 receives metrology data about a product having a detected violation, and finds identifying information for a process tool used to manufacture the product having the detected violation. This identifying information, which is resolved using a set of special queries from the EES database 110, includes a tool ID, a run ID, a run start time, etc. The tool 120 may then store the identifying information and sensor data associated with the identified process tool in the EES database 110, which may be hosted by the same machine as the EES 102 or a separate machine(s). As will be discussed in more detail below, the FD reporting tool 120 may also correlate sensor data, including alarming parameters of a process tool (e.g., FD), with metrology data, including metrology characteristics of a product manufactured by the process tool. The FD reporting tool 120 may also provide Graphical User Interfaces (GUIs) that link sensor and metrology data and provide users with fast and accurate information about the product and equipment quality. The GUIs are presented on EES clients 112, which may be thick client applications and/or web-based browser clients.

In one embodiment, when a product is run on a process tool, sensor data is provided to the EES 102 in real time by the MES 106 or a process tool 108 and is saved in the EES database 110. The EES 102 then performs FD analysis on the sensor data of the process tool and saves the results in the EES database 110 with context, such as TOOL ids, RUN ids, RUN start times, and RECIPE ids. Subsequently, a metrology tool 108 measures metrology data (e.g., product attributes) and provides these measurements to the EES 102, which sends them to the SPC system 104. The SPC system 104 returns a reference to SPC results (or SPC summary data), such as unique sample identifiers, violation identifiers, corrective action information, and effected chart identifiers.

In one embodiment, the FD reporting tool 120 allows a user to provide a configuration to associate process steps or operations that can impact one or more measured product attributes. This configuration is done when data collection strategy is defined for the system 100. The FD reporting tool 120 then collects references to the past FD results for the configured process steps or operations, and stores the linkage between SPC results and the sensor data (e.g., FD and process tool data) in the EES database 110 for reporting.

Figure 2:
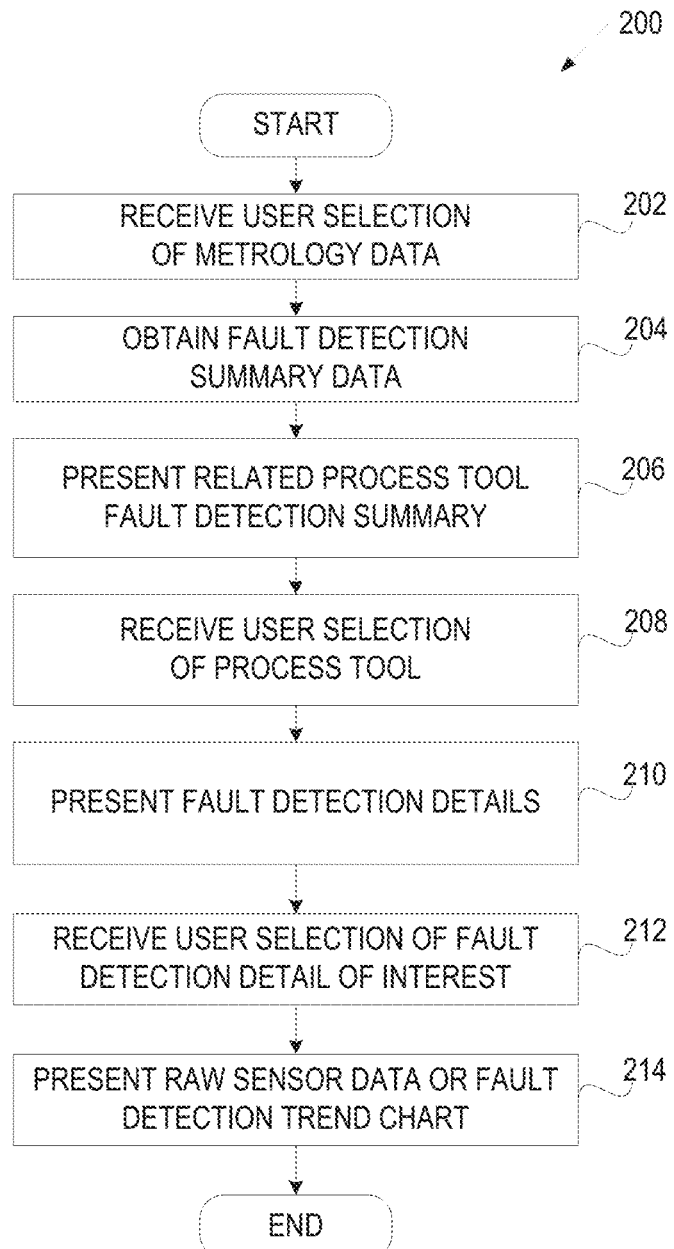
FIG. 2 is a flow diagram of a method for linking metrology data to sensor data according to an embodiment of the present invention.
Figure 3:
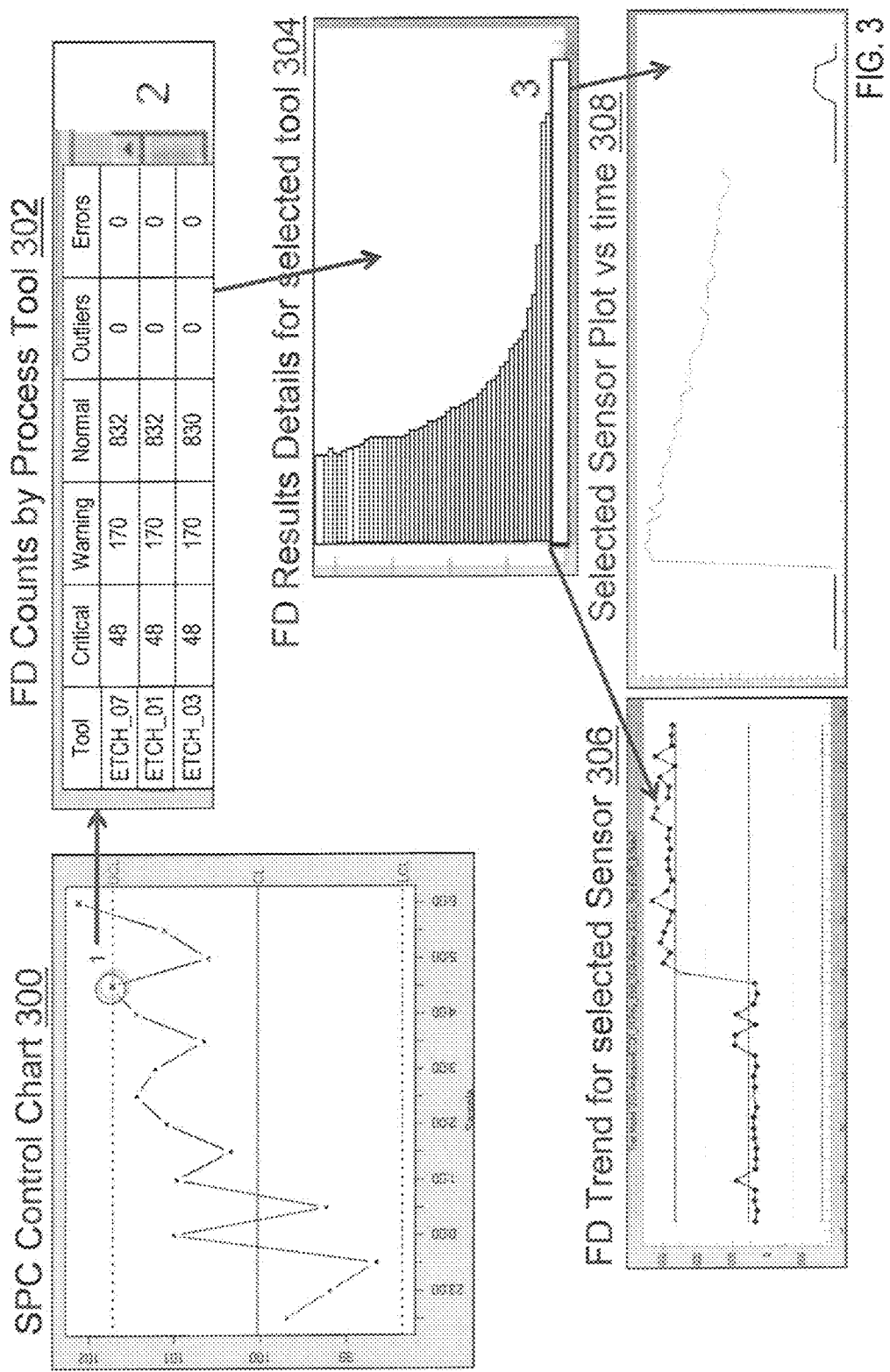
FIG. 3 illustrates exemplary graphical user interfaces for the method of FIG. 2.

FIG. 2 is a flow diagram of one embodiment of a method 200 for linking metrology data to sensor data. FIG. 3 illustrates exemplary graphical user interfaces for the method 200 of FIG. 2. The method 200 may be performed by EES 102, as shown in FIG. 1. For example, the method 200 may be performed by the FD reporting tool 120 of the EES 102 of FIG. 1.

Method 200 begins with the EES 102 receiving a user selection of metrology data (e.g., a product measurement) that indicates an SPC violation (block 202). Here, the user may select a product measurement on an SPC control chart. For example, the user may select a product measurement from an SPC Control Chart GUI 300, as shown in FIG. 3.

Once the user selection of the product measurement is received, the EES 102 obtains FD summary data related to the selected product measurement by querying the EES database 110 (block 204). Then, the EES 102 presents the related process tool FD summary data to the user (block 206). For example, the FD summary data may be presented as an FD Counts by Process Tool GUI 302, as shown in FIG. 3. As shown in FIG. 3, the FD Counts by Process Tool GUI 302 shows the FD summary data on a process tool basis. That is the FD Counts by Process Tool GUI 302 shows a table with multiple rows, each row corresponding to one of the processor tools. For each process tool, the table of the FD Counts by Process Tool GUI 302 has multiple columns, each column corresponding to a FD result type (e.g., Critical Count, Warning Count, Normal Count, Outlier Count, and Error Count). For example, FIG. 3 shows a portion of the table with 3 process tools: Etch_07, Etch_01, and Etch_03 and corresponding FD Counts from the FD summery data for each of these FD result types. As illustrated in this example, the FD results for the process tool Etch_07 has the following FD counts: 48 Critical Count, 170 Warnings Count, 830 Normal Count, 0 Outliers Count, and 0 Errors Count.

Next, the user selects a process tool of interest from the FD summary data. For example, the user may select the process tool ETCH_01 on the FD Counts by Process Tool GUI 302, as shown in FIG. 3. The EES 102 then receives the user selection of the process tool of interest (block 208).

Once the user selection is received, the EES 102 launches a new report to present FD details from the EES database 110 based on the user selected process tool (block 210). For example, the FD details may be presented as an FD Results Details GUI 304, as shown in FIG. 3.

Next, the user selects an FD detail of interest. For example, the user may select an FD detail of interest from an FD Results Details GUI 304, as shown in FIG. 3. The EES 102 then receives the user selection of the FD details (block 212).

Based on the user selection of the FD detail of interest, the EES 102 obtains raw sensor data for the process tool from the EES database 110 and presents the raw sensor data, and/or the EES 102 obtains an FD trend chart for the selected sensor from the EES database 110 and presents the FD trend chart (block 214). For example, the EES 102 may present the raw sensor data as a Selected Sensor Plot vs Time GUI 308, as shown in FIG. 3. In another example, the EES 102 may present the FD trend chart as an FD Trend for Selected Sensor GUI 306, as shown in FIG. 3.

Figure 4:
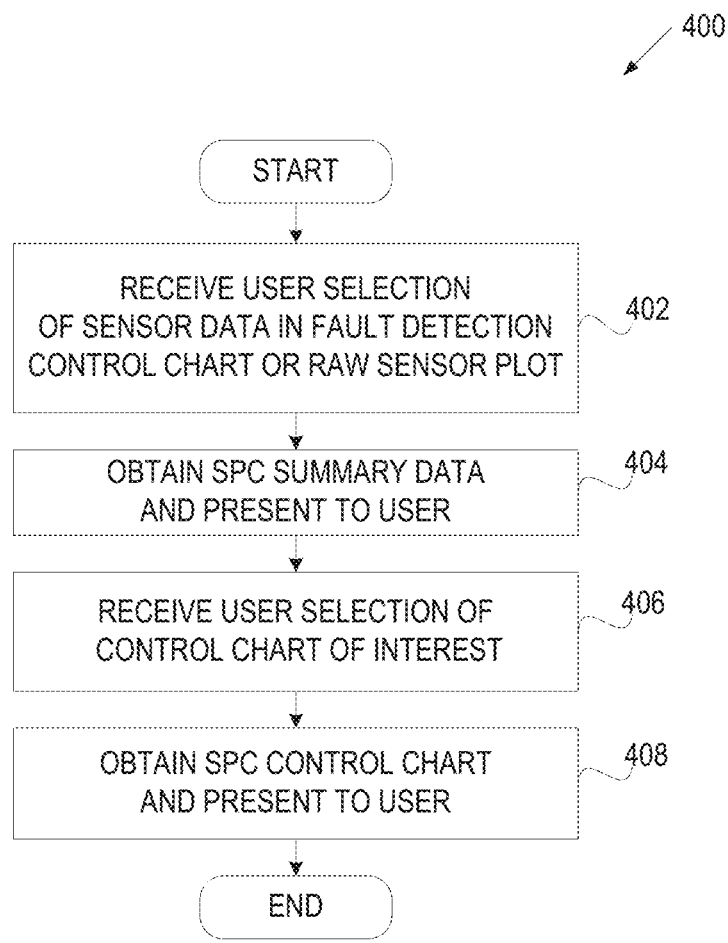
FIG. 4 is a flow diagram of a method for linking sensor data to metrology data according to an embodiment of the present invention.
Figure 5:
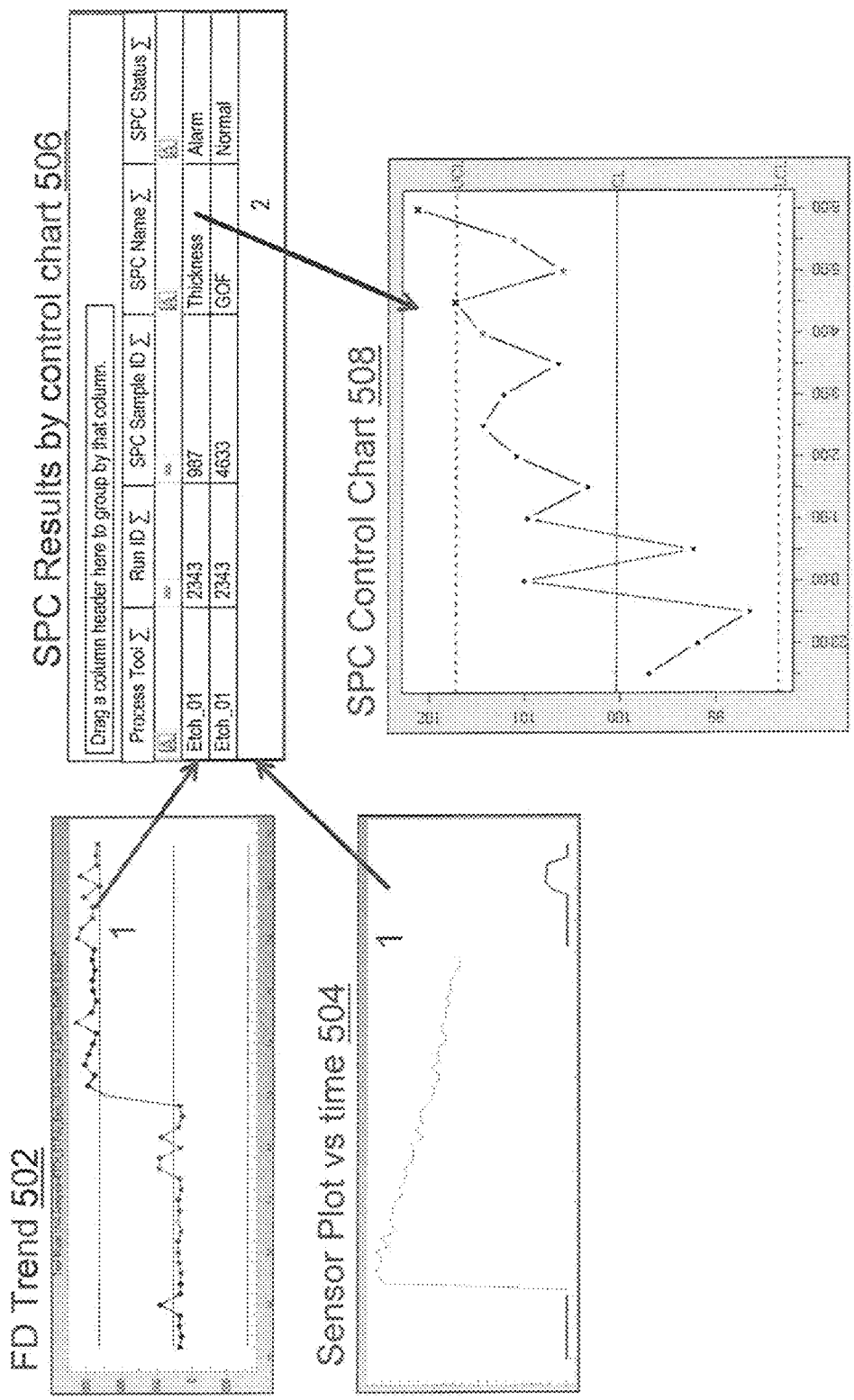
FIG. 5 illustrates exemplary graphical user interfaces for the method of FIG. 4.

FIG. 4 is a flow diagram of one embodiment of a method 400 for linking sensor data (e.g., FD data) to metrology data (e.g., SPC data). FIG. 5 illustrates exemplary graphical user interfaces for the method of FIG. 4. The method 400 may be performed by EES 102 of FIG. 1. For example, the method 400 may be performed by the FD reporting tool 120 of the EES 102 of FIG. 1.

Method 400 begins with the EES 102 receiving a user selection of sensor data of interest (block 402) from an FD control chart or a raw sensor plot. For example, the FD control chart may be presented to the user as an FD Trend GUI 502, as shown in FIG. 5. In another example, the raw sensor plot may be presented to the user as a Sensor Plot vs Time GUI 504, as shown in FIG. 5.

Once the user selection from the FD control chart or the raw sensor plot is received, the EES 102 obtains the SPC summary data corresponding to the selected data from the EES database 110. Then, the EES 102 presents the SPC summary data to the user (block 404). For example, the SPC summary data may be presented to the user as an SPC Results by Control Chart GUI 506, as shown in FIG. 5.

Next, the user selects a portion of the SPC summary data of interest, and the EES 102 receives the user selection of the SPC summary data of interest (block 406). For example, the user may select the portion of the SPC summary data of interest via an SPC Results by Control Chart GUI 506, as shown in FIG. 5.

The EES obtains the SPC control chart from the EES database 110 and presents it to the user (block 408). For example, the SPC control chart may be presented as an SPC Control Chart GUI 508, as shown in FIG. 5.

Table EES_SPC_RUN_TO_SPC, table EES_SPC_Status, and table EES_SPC_TO_RUN illustrate exemplary tables in the EES database 110. Table EES_SPC_RUN_TO_SPC associates Tool ID and Run ID with Sample ID. This table provides many to many relationships between Tool ID, Run ID and Sample ID. This table is partitioned by Run Start_Time by Range.

TABLE EES_SPC_RUN_TO_SPC

| Col# | Column Name | Data Type | Not Null? | Comments |
|---|---|---|---|---|
| 1 | START_TIME | TIMESTAMP(3) | Y | This column represents the starting time of the process run which is providing the source of the data being submitted to the SPC system. |
| 2 | TOOL_ID | INTEGER(38) | Y | This column represents the tool identifier that is associated with the data sample (see SAMPLE_ID column) which is stored in the SPC system. |
| 3 | PARTITION_ID | INTEGER(38) | Y | This column represents the partition identifier that is associated with the tool (see TOOL_ID column). |
| 4 | RUN_ID | NUMBER(38) | Y | This column represents the run identifier that is associated with a particular sample (see SAMPLE_ID column) which is stored in the SPC system. |
| 5 | SPC_SAMPLE_ID | NUMBER | Y | This column represents a unique SPC sample identifier which is generated by the SPC system when new data has been submitted to the SPC system. A single sample in the SPC system represents a single measurement, such as a thickness measurement. |
| 6 | SPC_TIME_STAMP | TIMESTAMP(3) | Y | This column represents the timestamp (date and time) of the sample (see SAMPLE_ID column) stored in the SPC system. This timestamp is generated by the SPC system when new data has been submitted to the SPC system. This timestamp may in fact be associated with multiple samples (measurements) as multiple measurements can be submitted to the SPC system at the same time. |

Table EES_SPC_Status stores SPC status for a given Sample ID. This table provides one to many relationships from a Sample ID to many Chamber/SPC context information. This table is partitioned by SPC Timestamp.

TABLE EES_SPC_Status

| Col# | Column Name | Data Type | Not Null? | Comments |
|---|---|---|---|---|
| 1 | SPC_TIME_STAMP | TIMESTAMP(3) | Y | This column represents the timestamp (date and time) of the sample (see SAMPLE_ID column) stored in the SPC system. This timestamp is generated by the SPC system when new data has been submitted to the SPC system. This timestamp may in fact be associated with multiple samples (measurements) as multiple measurements can be submitted to the SPC system at the same time. |
| 2 | SPC_SAMPLE_ID | NUMBER | Y | This column represents a unique SPC sample identifier which is generated by the SPC system when new data has been submitted to the SPC system. A single |

TABLE EES_SPC_Status (continued)

| Col# | Column Name | Data Type | Not Null? | Comments |
|------|-------------|-----------|-----------|----------|
| | | | | sample in the SPC system represents a single measurement, such as a thickness measurement. |
| 3 | SPC_GROUP_ID | NUMBER | Y | This column represents the SPC group identifier in the SPC system where the data sample (see SPC_SAMPLE_ID column) that was submitted was ultimately stored to. A SPC group represents the graphical charting mechanism related to a particular measurement parameter, such as temperature, which matches a particular context criteria, such as LOT ID, TOOL ID, RECIPE_ID. |
| 4 | SPC_SUBGROUP_ID | NUMBER | Y | This column represents the SPC sub-group identifier in the SPC system where the data sample (see SPC_SAMPLE_ID column) was ultimately stored to. A SPC sub-group represents the graphical charting mechanism related to a particular measurement parameter, such as temperature, which matches a UNIQUE set of context criteria, such as LOT ID = "12345", TOOL ID = "123", and RECIPE_ID = "ABC". |
| 5 | SPC_VIOLATION | VARCHAR2(80) | Y | This column represents a string description of an SPC violation which had been detected on the sample. Examples: "WE1 on Mean value", "Specification limit violation on raw value". |
| 6 | SPC_PARAMETER | VARCHAR2(40) | Y | This column represents the name of the measurement parameter that represents the sample. For example: Temperature. |
| 7 | SPC_CONTEXT | VARCHAR2(2000) | Y | This column represents the context information for a sample. The value of the context is stored as a comma-separated list of context attribute values that represent the sample. For example: "LOT_ID = 123456, RECIPE_ID = ABC, PRODUCT_ID = XYZ" |

Table EES_SPC_TO_RUN associates SPC Sample ID with Tool ID and Run ID. This table is partitioned by Sample ID Timestamp.

TABLE EES_SPC_TO_RUN

| Col# | Column Name | Data Type | Not Null? | Comments |
|------|-------------|-----------|-----------|----------|
| 1 | SPC_START_TIME | TIMESTAMP(3) | Y | This column represents the timestamp (date and time) of the sample (see SAMPLE_ID column) stored in the SPC system. This timestamp is generated by the SPC system when new data has been submitted to the SPC system. This timestamp may in fact be associated with multiple samples (measurements) as multiple measurements can be submitted to the SPC system at the same time. |
| 2 | SPC_SAMPLE_ID | NUMBER | Y | This column represents a unique SPC sample identifier which is generated by the SPC system when new data has been submitted to the SPC system. A single sample in the SPC system represents a single measurement, such as a thickness measurement. |

-continued

TABLE EES_SPC_TO_RUN

| Col# | Column Name | Data Type | Not Null? | Comments |
|---|---|---|---|---|
| 3 | TOOL_ID | INTEGER(38) | Y | This column represents the tool identifier that is associated with the data sample (see SAMPLE_ID column) which is stored in the SPC system. |
| 4 | PARTITION_ID | INTEGER(38) | Y | This column represents the partition identifier that is associated with the tool (see TOOL_ID column). |
| 5 | RUN_ID | NUMBER(38) | Y | This column represents the run identifier that is associated with a particular sample (see SAMPLE_ID column) which is stored in the SPC system. |
| 6 | START_TIME | TIMESTAMP(3) | Y | This column represents the starting time of the process run which is providing the source of the data being submitted to the SPC system. |

Figure 6:
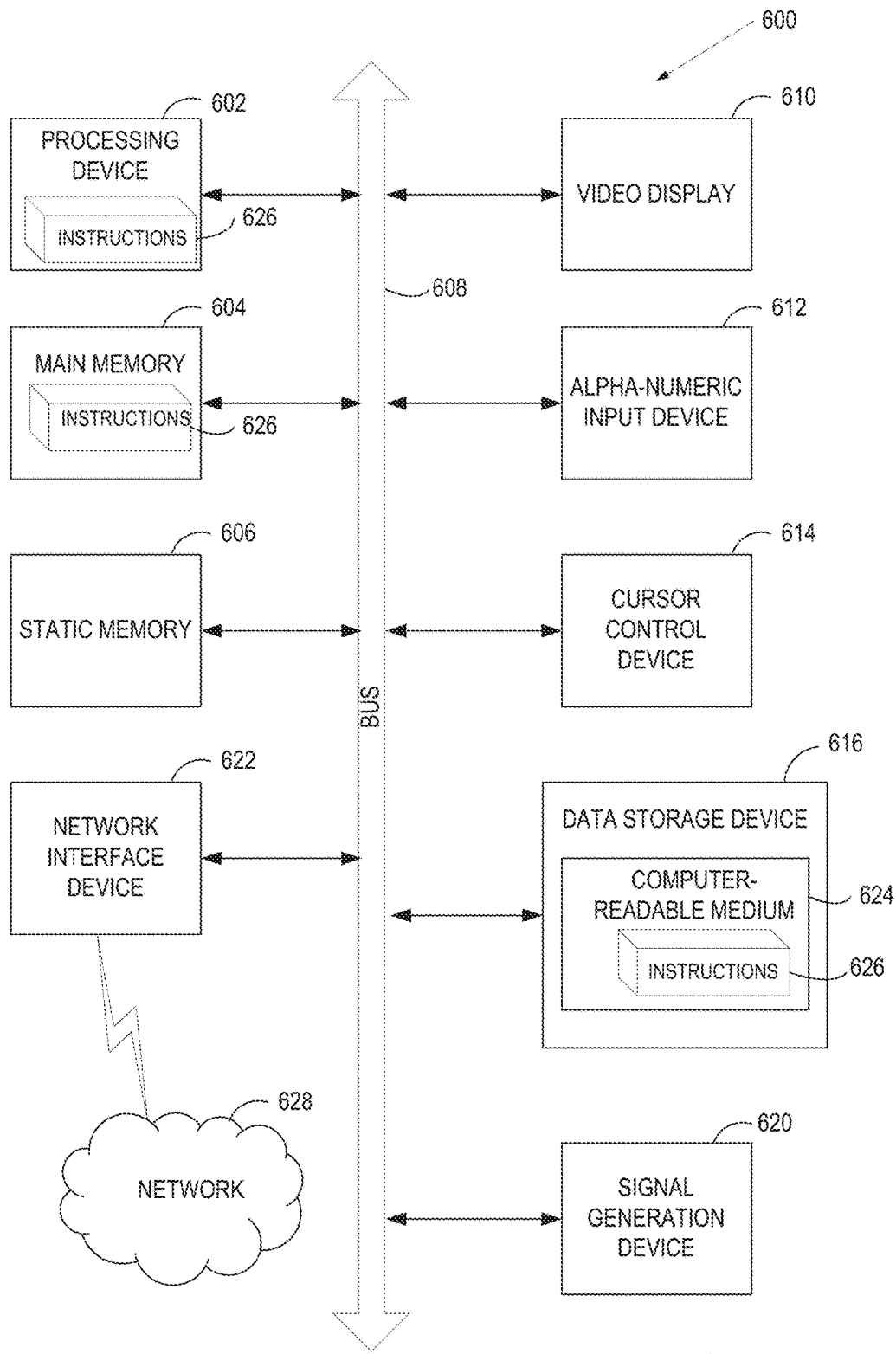
FIG. 6 is a block diagram illustrating an exemplary computing device.

FIG. 6 is a block diagram illustrating an exemplary computing device (or system) 600. The computing device 600 includes a set of instructions for causing the computing device 600 to perform any one or more of the methodologies discussed herein. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

The exemplary computer device 600 includes a processing system (processing device) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the EES 102 of FIG. 1 for performing the operations and steps discussed herein.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 embodying any one or more of the methodologies or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions 626 may further be transmitted or received over a network 628 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "constructing," "cutting," "identifying," "selecting," "creating," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   creating a plurality of linkages between a first plurality of graphical user interfaces (GUIs) comprising product measurements of a product with a second plurality of GUIs comprising fault detection data for one or more process tools manufacturing the product, wherein the fault detection data is created based on data from the one or more process tools;
   presenting a first GUI of the first plurality of GUIs, the first GUI comprising a subset of the product measurements of the product, wherein the subset of product measurements is made by a metrology tool;
   receiving, by a processing device, a first user selection of one of the subset of product measurements for the product in the first GUI;
   selecting, by the processing device, based on the plurality of linkages between the first plurality of GUIs and the second plurality of GUIs, a second GUI of the second plurality of GUIs, the second GUI comprising fault detection data that is related to the first user selection of one of the subset of product measurements;
   presenting, by the processing device, the second GUI comprising the fault detection data, the fault detection data specifying one or more process tools used to manufacture the product and a fault detection count for each of a plurality of fault detection types of the fault detection data for each of the one or more process tools used to manufacture the product;
   receiving, by the processing device, a second user selection of one of the one or more process tools specified by the fault detection data in the second GUI; and
   presenting, by the processing device, a third GUI of the second plurality of GUIs, the third GUI comprising fault detection detail information of the selected process tool.

2. The method of claim 1, wherein the fault detection data is created from a fault detection analysis performed on sensor data produced by the one or more process tools.

3. The method of claim 1, further comprising:
   receiving a third user selection of a subset of the fault detection detail information in the third GUI; and
   presenting a fourth GUI comprising related raw sensor data for the selected subset of fault detection detail information.

4. The method of claim 3, further comprising:
   presenting a related fault detection trend chart for the selected fault detection detail information in the fourth GUI.

5. The method of claim 3, further comprising:
   receiving a fourth user selection of a subset of the related raw sensor data in the fourth GUI;
   presenting a fifth GUI comprising related statistical process control summary data for the selected subset of the related raw sensor data;
   receiving a fifth user selection of a statistical process control chart from the statistical process control summary data in the fifth GUI; and
   presenting a sixth GUI comprising the selected statistical process control chart.

6. The method of claim 5, wherein the sensor data comprises a fault detection control chart.

7. The method of claim 5, wherein the sensor data comprises a raw sensor plot.

8. A non-transitory computer-readable storage medium comprising executable instructions to cause a processing device to perform operations, the operations comprising:
   creating a plurality of linkages between a first plurality of graphical user interfaces (GUIs) comprising product measurements of a product with a second plurality of GUIs comprising fault detection data for one or more process tools manufacturing the product, wherein the fault detection data is created based on data from the one or more process tools;
   presenting a first GUI of the first plurality of GUIs, the first GUI comprising a subset of the product measurements of the product, wherein the subset of product measurements is made by a metrology tool;
   receiving, by the processing device, a first user selection of one of the subset of product measurements for the product in the first GUI;
   selecting, by the processing device, based on the plurality of linkages between the first plurality of GUIs and the second plurality of GUIs, a second GUI of the second plurality of GUIs, the second GUI comprising fault detection data that is related to the first user selection of one of the subset of product measurements;
   presenting, by the processing device, the second GUI comprising the fault detection data, the fault detection data specifying one or more process tools used to manufacture the product and a fault detection count for each of a plurality of fault detection types of the fault detection data for each of the one or more process tools used to manufacture the product;

receiving, by the processing device, a second user selection of one of the one or more process tools specified by the fault detection data in the second GUI; and presenting, by the processing device, a third GUI of the second plurality of GUIs, the third GUI comprising fault detection detail information of the selected process tool.

9. The non-transitory computer-readable storage medium of claim 8, wherein the operations further comprise:

receiving a third user selection of a subset of the fault detection detail information in the third GUI; and presenting a fourth GUI comprising related raw sensor data for the selected subset of fault detection detail information.

10. The non-transitory computer-readable storage medium of claim 9, wherein the operations further comprise:

presenting a related fault detection trend chart for the selected fault detection detail information in the fourth GUI.

11. The non-transitory computer-readable storage medium of claim 9, wherein the operations further comprise:

receiving a fourth user selection of a subset of the related raw sensor data in the fourth GUI;

presenting a fifth GUI comprising related statistical process control summary data for the selected subset of the related raw sensor data;

receiving a fifth user selection of a statistical process control chart from the statistical process control summary data in the fifth GUI; and presenting a sixth GUI comprising the selected statistical process control chart.

12. The non-transitory computer-readable storage medium of claim 11, wherein the sensor data comprises a fault detection control chart.

13. The non-transitory computer-readable storage medium of claim 11, wherein the sensor data comprises a raw sensor plot.

14. A computing system comprising:

a memory; and a processing device, coupled to the memory, to:

create a plurality of linkages between a first plurality of graphical user interfaces (GUIs) comprising product measurements of a product with a second plurality of GUIs comprising fault detection data for one or more process tools manufacturing the product, wherein the fault detection data is created based on data from the one or more process tools;

present a first GUI of the first plurality of GUIs, the first GUI comprising a subset of the product measurements of the product, wherein the subset of product measurements is made by a metrology tool;

receive a first user selection of one of the subset of product measurements for the product in the first GUI;

select, based on the plurality of linkages between the first plurality of GUIs and the second plurality of GUIs, a second GUI of the second plurality of GUIs, the second GUI comprising fault detection data that is related to the first user selection of one of the subset of product measurements;

present the second GUI comprising the fault detection data, the fault detection data specifying summaries comprising data for one or more of process tools used to manufacture the product and a fault detection count for each of a plurality of fault detection types of the fault detection data for each of the one or more process tools used to manufacture the product;

receive a second user selection of one of the one or more process tools specified by the fault detection data in the second GUI; and a third GUI of the second plurality of GUIs, the third GUI comprising fault detection detail information of the selected process tool.

15. The computing system of claim 14, wherein the fault detection data is are created from a fault detection analysis performed on sensor data produced by the one or more process tools.

16. The computing system of claim 15, wherein the processing device is further to:

receive a third user selection of a subset of the fault detection detail information in the third GUI; and present a fourth GUI comprising related raw sensor data for the selected subset of fault detection detail information.

17. The computing system of claim 16, wherein the processing device is further configurable to:

present a related fault detection trend chart for the selected fault detection detail information in the fourth GUI.

18. The computing system of claim 14, wherein the processing device is further to:

receive a fourth user selection of a subset of the related raw sensor data in the fourth GUI;

present a fifth GUI comprising related statistical process control summary data for the selected subset of the related raw sensor data;

receive a fifth user selection of a statistical process control chart from the statistical process control summary data in the fifth GUI; and present a sixth GUI comprising the selected statistical process control chart.

19. The computing system of claim 18, wherein the sensor data comprises a fault detection control chart.

20. The computing system of claim 18, wherein the sensor data comprises a raw sensor plot.

* * * * *